April 6, 1954  F. J. TRAINOR  2,674,119
HYDROMETER
Filed July 9, 1951
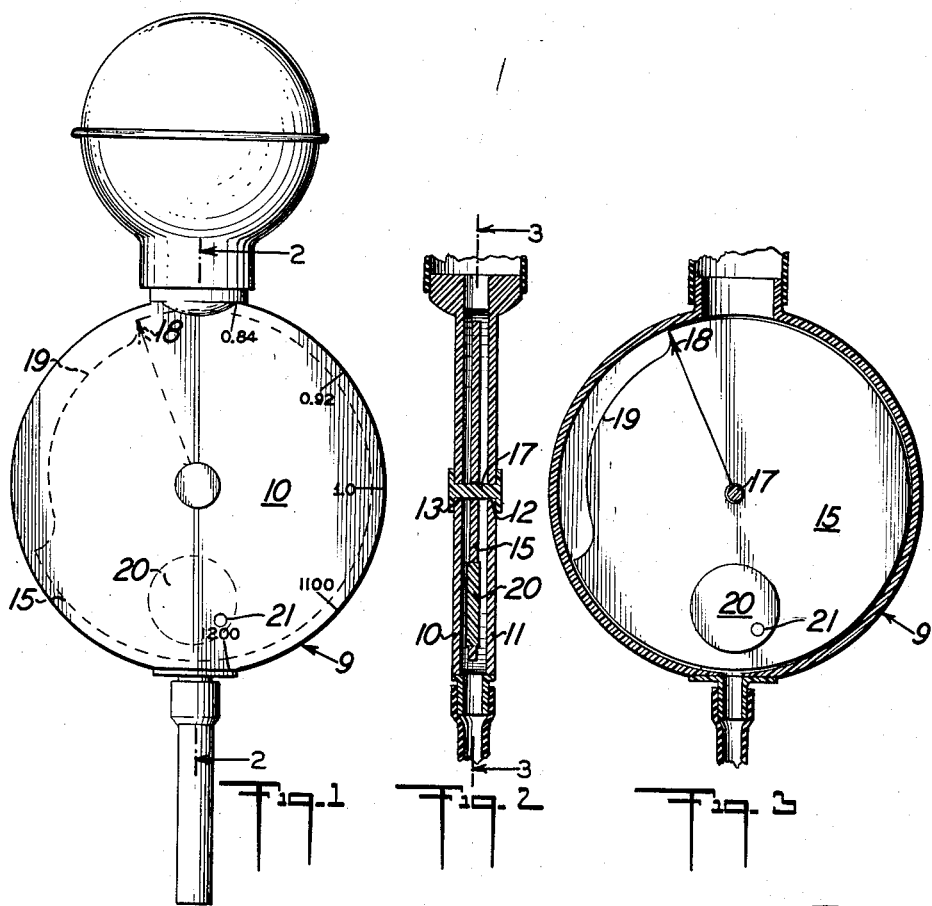
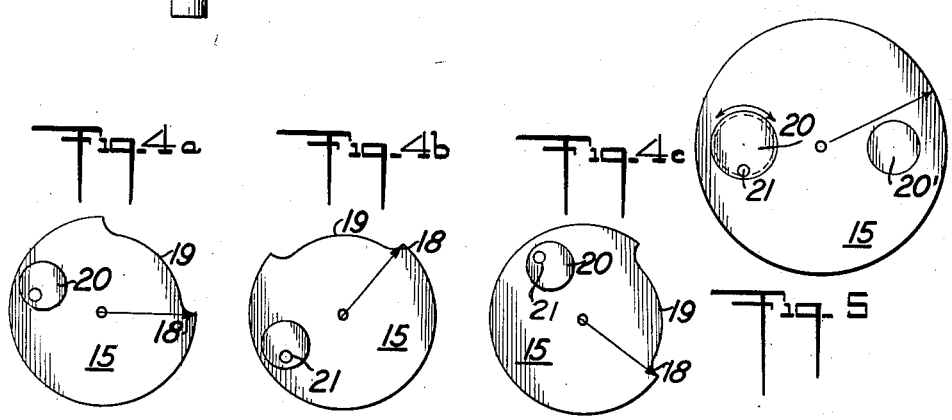
INVENTOR.
FOSTER J. TRAINOR
BY Henry Heyman
ATTORNEY Patented Apr. 6, 1954

2,674,119

UNITED STATES PATENT OFFICE 2,674,119

HYDROMETER

Foster J. Trainor, Holly Hill, Fla.

Application July 9, 1951, Serial No. 235,774

4 Claims. (Cl. 73—33)

1

This invention relates to hydrometers and, more particularly, to a hydrometer which is capable of measuring specific gravities of fluids having densities both above and below unity.

The hydrometers of the prior art are most frequently of the elongated tube and weighted buoyant float type. This type of hydrometer is a reliable instrument when carefully used with a thermometer and temperature correction chart. The tube must be only partially filled and manipulated so as to break the fluid adhesion between the tube and float. Further, this type of hydrometer is limited by the weight and volume of its float to either liquids of density above or below unity specific gravity.

It is an object of my invention to provide a hydrometer which is rugged in construction, simple and fool-proof in operation, and useful for indicating the gravity of fluids in a range both above and below unity. Further, it is an object of the invention to provide a hydrometer for indicating specific gravities translated into a scale of freezing temperatures of anti-freeze mixtures having characteristic specific gravities both above and below unity.

These and other objectives are obtained by providing the hydrometer buoyant element in the form of a uniquely shaped disc pivoted in a flat transparent case of preferably circular shape and provided with the usual suction tube and bulb.

The invention will be readily understood by reading the subjoined detailed description with reference to the accompanying drawing made a part of this specification.

Figure 1 shows, in elevation, a complete hydrometer fabricated in accordance with my invention.

Figure 2 is a cross sectional view of the float chamber of my hydrometer taken on plane 2—2 of Figure 1.

Figure 3 is a cross sectional view taken through my hydrometer on plane 3—3 of Figure 2.

Figure 4 shows in a, b and c, the direction of the float indicator for fluids of specific gravity having a value of unity, less than unity and greater than unity, respectively. These indications may, for example, refer to pure water, a propolene glycol-water mixture, or an ethylene glycol mixture, respectively.

Figure 5 shows an alternate and preferred embodiment of my hydrometer indicating element.

The preferred embodiment of my invention as shown in the drawings comprises a case 9 of transparent plastic material much as polyrinol chloride, polystyrene, methyl methacrylate, polyethylene and others. The case comprises two approximately circular lateral faces 10 and 11. At the center thereof, I provide a pair of journals 12 and 13 for pivotally supporting the disc 15 on its axle 17.

The disc 15 is preferably circular in shape for approximately 270° of its perimeter and has a portion 19 of its perimeter relieved for approximately 90°. The purpose of the perimeter relieved portion is to provide a differential in balance of the disc across its axle when immersed in fluid and to provide an expanded scale. A pointer mark 18 is provided on the disc with its pointer end terminating near the periphery of the disc adjacent the relieved portion 19. In a position proximate a portion diametrically opposite the pointer mark 18, a buoyant element 20 is rotatably supported in the disc. A small weight 21 is set into the buoyant element between and spaced from the center and periphery thereof. The buoyant element is a substance of density less than one and preferably is a substance like polyethylene. This material has a coefficient of expansion very nearly the same as water. Accordingly, it expands and contracts with temperature changes in very nearly the same degree as the fluid being tested, thereby closely preserving the same relative buoyancy. The hydrometer is therefore self temperature correcting. The hydrometer disc 15 is standardized for a selected fluid by rotatably adjusting buoyant element 20.

The disc 15 is pivotally supported by an axle 17 which preferably is unitarily affixed thereto, either by molding, or by joining the plastic axle and disc together by means of a solvent.

From the foregoing, it is seen that a hydrometer which is simple, rugged and accurate results from the use of my invention. The movable element cannot stick, so inaccurate readings are avoided. The amount of fluid required for a reading is not critical, provided the disc is completely submerged. The clearance between the disc and float need not be large, thereby relieving in the necessity for a large quantity of fluid. This is a real advantage for the reason that the electrolyte of batteries is frequently tested when the electrolyte is low and only a small quantity of the fluid is available.

It is to be understood that the hydrometer is applicable to the testing of any type of fluid. The only change necessary in the fabrication of the device for fluids of greatly differing specific gravities is the nature and rotatable adjustment of the buoyant element 20. Further, the disc may be made of plastic having either a density greater than one or less than one. Since the weight of fluid displaced by the semi-circles on opposite sides of the axle differs by the volume of material removed from the disc cutaway portion, it is apparent that the scale of readings can be contracted or lengthened as desired depending on the amount of material removed from the disc periphery and the length of arc of the relieved portion.

An alternate embodiment is shown in Figure 5 which is inherently constructed so as to be adjustable for operation in any specific gravity fluid and, in addition, provides excellent temperature compensation.

The buoyant element 20 contains within its circumference a weight 21. Disc 15 is provided with a circularly removed portion, the circumference of which rotatably supports element 20. It follows that the hydrometer disc 15 is standardized for any particular fluid by the rotation of the element 20 until the weight 21 is at the proper distance from the center of the disc. It is apparent that the rotational adjustability of element 20 with its weight 21 provides means for expanding or contracting the sweep of the pointer for a given range of densities. The additional buoyant element 20' takes the place, substantially, of the relieved peripheral portion of the embodiment of Figures 4a through 4c.

Disc 15 also supports buoyant element 20' disposed approximately 180° from element 20. When the thermal expansion of a liquid is to be compensated and differs from the thermal expansion elements 20 and 20', it is only necessary to select different thermal coefficients for the material of elements 20 and 20' so that the effective differential in expansion matches the thermal coefficient of expansion of the liquid.

What I claim:

1. A hydrometer comprising a flat transparent syringe adapted to be utilized with the plane of the large dimension vertical, a disc pivotally supported in the syringe in the plane substantially parallel to the syringe large dimension, a pointer on said disc and adapted to cooperate with a scale of gravity readings on said syringe, a first buoyant element rotatably supported in the disc proximate the periphery of the disc approximately 180° from the pointer and containing a weighted portion eccentrically mounted in the said first buoyant element, and a second buoyant element supported in the disc adjacent the pointer, whereby said hydrometer is standardized for a liquid by adjustably rotating the first buoyant element.

2. A hydrometer float comprising a disc having density indicating indicia thereon and adapted to be pivotally supported for rotation in a vertical plane, said disc rotatably supporting in a seat therein a buoyant element, a weight, small in size compared to the size of the buoyant element, supported in the buoyant element at a position spaced from the center thereof, and a pointer indication on said disc, whereby the rotational characteristic of said disc when completely immersed in liquid is adjusted by adjusting the angular position of the buoyant element.

3. A hydrometer float comprising a disc having an axle normal to the plane thereof and adapted to be pivotally supported on substantially horizontally aligned journals, said disc having a pointer indication thereon, a first buoyant element rotatably supported in said disc between the center and the periphery thereof and approximately 180° from the pointer indication, a small weight supported in said first buoyant element between and spaced from the center of rotation and the periphery thereof, a second buoyant element supported in the disc adjacent the pointer, whereby said hydrometer disc is standardized for a liquid when totally immersed in said liquid by adjusting the angular position of the first buoyant element.

4. A hydrometer float comprising a disc adapted to be pivotably supported, said disc having a pointer indication thereon, an elongated peripheral portion of the material of the disc adjacent one side of the pointer indication being removed to unbalance the disc, a buoyant element rotatably supported in said disc between the center and the periphery thereof and approximately 180° from the pointer indication, a small weight eccentrically supported in said buoyant element whereby said hydrometer disc is standardized for a fluid by adjusting the angular position of said buoyant element.

References Cited in the file of this patent

FOREIGN PATENTS

| Number | Country | Date |
|--------|---------|------|
| 410,935 | Great Britain | May 31, 1934 |
| 426,097 | Great Britain | Mar. 27, 1935 |
| 462,051 | Great Britain | Mar. 1, 1937 |